(12) United States Patent
Seilmeier

(10) Patent No.: US 11,258,396 B2
(45) Date of Patent: Feb. 22, 2022

(54) METHOD FOR OPERATING A POWER CONVERTER, POWER CONVERTER FOR A PERMANENTLY EXCITED ELECTRIC MACHINE, VEHICLE AND COMPUTER PROGRAM PRODUCT

(71) Applicant: Valeo Siemens eAutomotive Germany GmbH, Erlangen (DE)

(72) Inventor: Markus Seilmeier, Fürth (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 0 days.

(21) Appl. No.: 17/050,598

(22) PCT Filed: May 9, 2019

(86) PCT No.: PCT/EP2019/061931
§ 371 (c)(1),
(2) Date: Oct. 26, 2020

(87) PCT Pub. No.: WO2019/219501
PCT Pub. Date: Nov. 12, 2019

(65) Prior Publication Data
US 2021/0119567 A1  Apr. 22, 2021

(30) Foreign Application Priority Data

May 18, 2018  (DE) .................. 10 2018 112 107.5

(51) Int. Cl.
*H02P 29/66* (2016.01)
*H02P 21/22* (2016.01)
*H02P 29/60* (2016.01)

(52) U.S. Cl.
CPC ............ *H02P 29/662* (2016.11); *H02P 21/22* (2016.02); *H02P 29/67* (2016.11)

(58) Field of Classification Search
CPC ......... H02P 29/662; H02P 21/22; H02P 29/67
See application file for complete search history.

(56) References Cited

U.S. PATENT DOCUMENTS 4,879,497 A * 11/1989 Meyer ................... G01K 7/20
318/400.08
2015/0022126 A1  1/2015 Schulz et al.
(Continued)

FOREIGN PATENT DOCUMENTS

DE           3736303 A1    5/1989
DE     102014109677 A1    1/2015
DE     102015005555 A1   11/2016

OTHER PUBLICATIONS

PCT/ISA/210, "International Search Report for International Application No. PCT/EP2019/061931," dated Jul. 16, 2019.
(Continued)

*Primary Examiner* — Zoheb S Imtiaz
(74) *Attorney, Agent, or Firm* — Manabu Kanesaka

(57) ABSTRACT

Method for operating a power converter for a permanently excited electric machine, wherein temperature information, which describes a temperature of at least one permanent magnet of the electric machine, is determined by means of an observer as a function of operating parameters of the electric machine, and the power converter is controlled as a function of the temperature information, wherein a computing device, which handles processes in time slices, carries out a first process in a first time slice for detecting parameter values for determining the operating parameters and carries out a second process, which determines the temperature information, in a second time slice, which is retrieved less frequently than the first time slice.

12 Claims, 4 Drawing Sheets

(56) References Cited

U.S. PATENT DOCUMENTS

Figure 1:
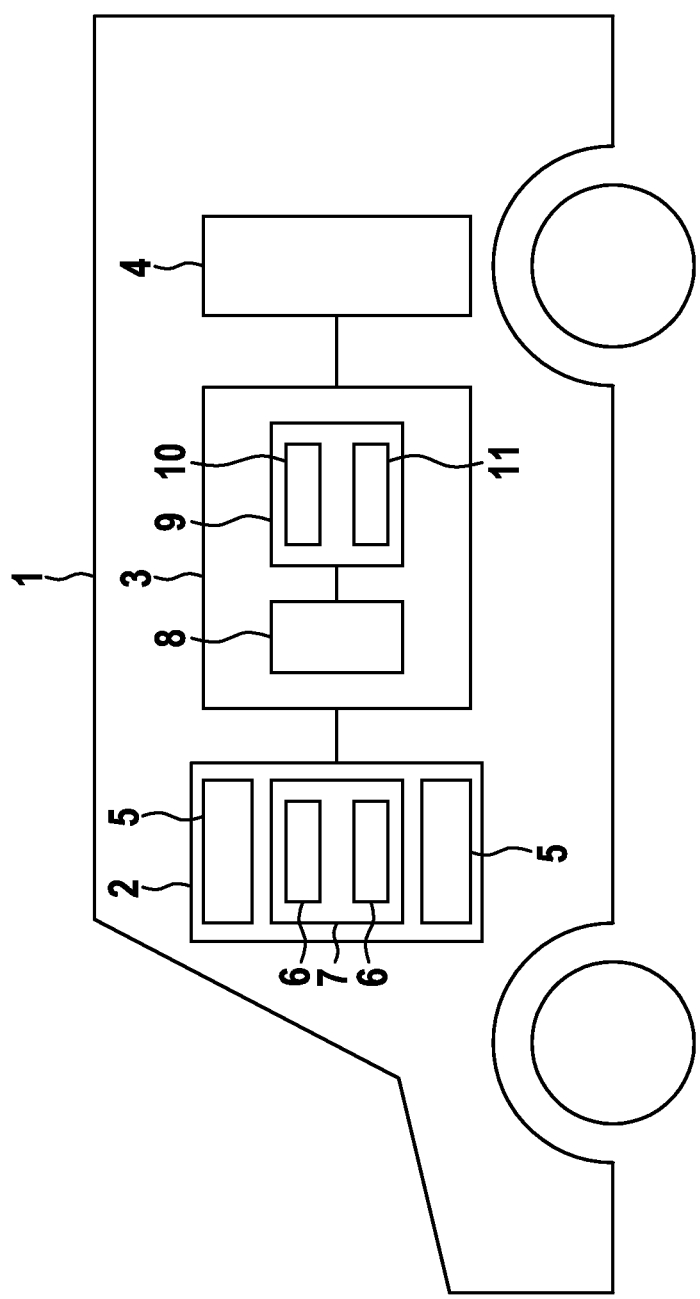

2016/0094178 A1* 3/2016 Dietz .................... H02P 29/62
                                                        318/400.02
2016/0156300 A1* 6/2016 Nakamura .............. B65H 7/20
                                                        271/256

OTHER PUBLICATIONS

PCT/ISA/237, "Written Opinion of the International Searching Authority for International Application No. PCT/EP2019/061931," dated Jul. 16, 2019.
Specht, A. et al., "Determination of Rotor Temperature for an Interior Permanent Magnet Synchronous Machine Using a Precise Flux Observer," The 2014 International Power Electronics Conference (IPEC-Hiroshima 2014, ECCE Asia), May 1, 2014 (May 1, 2014), p. 1501-1507, DOI: 10.1109/IPEC.2014.6869784, ISBN 978-1-4799-2705-0. XP055601878, the whole document.

\* cited by examiner

METHOD FOR OPERATING A POWER CONVERTER, POWER CONVERTER FOR A PERMANENTLY EXCITED ELECTRIC MACHINE, VEHICLE AND COMPUTER PROGRAM PRODUCT

The present invention relates to a method for operating a power converter for a permanently excited electric machine, wherein temperature information, which describes a temperature of at least one permanent magnet of the electric machine, is determined by means of an observer as a function of operating parameters of the electric machine, and the power converter is controlled as a function of the temperature information.

The invention also relates to a power converter for a permanently excited electric machine, a vehicle and a computer program product.

The consideration of a temperature of a permanent magnet in the control of an electric machine enables on the one hand a high torque accuracy, because the magnetic flux of the permanent magnet is significantly dependent on its temperature, and on the other hand protection against an irreversible demagnetisation of the permanent magnet if its Curie temperature is exceeded. In contrast to rather inaccurate techniques based on a thermal network, preferred methods for temperature determination are those which estimate the temperature by means of an observer on the basis of the counter-electromotive force of the electric machine.

Such a method for determining a magnet temperature of a permanently excited electric machine is known from document DE 10 2015 005 555 A1, in which a measured stator current of the machine, a stator voltage formed in a converter of the machine and a measured speed of the machine are fed to a magnet temperature monitoring unit. The magnet temperature monitoring unit determines a temperature difference from a flux difference between a determined permanent magnet flux and a reference magnet temperature, and from this determines the magnet temperature.

Conventional implementations of such a method, however, require a very high computing effort, since the observer very often has to carry out the estimation on the basis of parameter values detected at the current moment in time.

The object of the invention is consequently that of indicating an efficient implementation of a determination of temperature information by means of an observer.

According to the invention, this object is achieved by a method of the type mentioned at the outset, wherein a computing device, which handles processes in time slices, carries out a first process in a first time slice for detecting parameter values for determining the operating parameters and carries out a second process, which determines the temperature information, in a second time slice, which is retrieved less frequently than the first time slice.

The invention is based on the finding that a calculation of the temperature by the observer in the first time slice makes very strong use of the computing resources of the computing device. The invention therefore proposes to reduce the resource consumption of the computing device since the computationally complex process, which determines the temperature information by the observer, takes place in the less-frequent second time slice and only the resource-saving detection of the parameter values is carried out in the frequent first time slice. The method according to the invention allows, advantageously, a particularly efficient implementation of the determination of the temperature information, since the estimation problem is divided into a fast part to be processed in the first time slice and a slow part to be processed in the second time slice.

Typically, an observer is used to estimate the temperature of the permanent magnet on the basis of a counter-electromotive force (back-EMF) of the electric machine. In particular, the temperature relates to a mean value of a temperature distribution of the permanent magnet(s) of the electric machine. It is useful for the operating parameters to describe a speed of the electric machine and/or an actual output current of the power converter and/or a target current specified for controlling the power converter and/or an output voltage of the power converter. Preferably, the actual output current and/or the target current and/or the output voltage are described in dq-coordinates. For this purpose, the parameter values can be transformed into a dq-coordinate system within the scope of the method according to the invention. Preferably, a retrieval frequency of the first time slice corresponds to a clock frequency of the power converter. In terms of the invention, the term "process" describes a totality of computational tasks or individual processes which are carried out during a time slice.

Preferably, the first process of the method according to the invention also generates clocked switching signals for the control of the power converter. The first time slice can therefore also be regarded as a control time slice. The detection of the parameter values can therefore be integrated into the first time slice, which is provided in any case and which determines, in particular, the duty cycles of the clocked switching signals, since the detection of the parameter values can be processed in an extremely resource-saving manner.

Preferably, the parameter values are detected over a duration of one detection cycle, which includes one or more electrical or mechanical periods of the electric machine.

It is particularly advantageous that the mean values of the parameter values are calculated over the duration of the detection cycle for determining the operating parameters. For this purpose, accumulated sample values can be determined and stored as parameter values in the first process. The calculation of the mean values, in particular from the accumulated sample values, is expediently performed by the second process or by a process performed in a time slice that is retrieved less frequently than the first time slice.

The use of mean values to determine the operating parameters or as operating parameters has the advantage that harmonics and sub-harmonics, which are caused, for example, by stator grooves or magnetic saturation, are eliminated.

Normally, these harmonics would have to be taken into account by position-dependent model parameters in the observer, which is why computationally intensive trigonometric functions would have to be carried out as a function of multiples of the current rotor position angle, for example the sixth harmonic with reference to dq coordinates. Conventional methods make do with using a very slow observer dynamics, but this can lead to unwanted oscillations of the estimated temperature if the dynamics are not slow enough. Averaging, on the other hand, makes it possible to eliminate the harmonics already at the level of the operating parameter determination, thus further improving the method according to the invention.

A particular advantage may be that the parameter values are only used to determine the operating parameters if a validation criterion describing the existence of quasi-stationary operation of the electric machine is met and a new detection cycle is performed if the validation criterion is not met. In particular, this will ensure that the condition of quasi-stationary operation for the validity of the consideration of mean values is met. Quasi-stationary operation can be assumed because the thermal time constant of a rotor of the electric machine is typically in the order of minutes and is therefore very slow compared to the electrical dynamics of the power converter. It is therefore sufficient to perform the estimation comparatively slowly under quasi-stationary conditions.

The validation criterion may include a condition that a change in target currents of the power converter is within a specified range and/or a condition that a change in a speed of the electric machine is within a specified range. It can thus be ensured that no mean values based on parameter values obtained during a relevant change in the target currents or speed are used. Such a situation is, for example, the unexpected acceleration of a vehicle driven by the electric machine by a driver. In order to evaluate the validation criterion or its conditions, the first process can additionally determine and store a minimum value and/or a maximum value of the parameter values, which—like the previously mentioned accumulation of the parameter values—does not represent a significant additional load on the computing resources. The validation criterion is preferably evaluated by the second process or by a process carried out in a time slice that is retrieved less frequently than the first time slice.

It is expediently provided within the scope of the method according to the invention that the detection of the parameter values is started by trigger information which is only provided when start information is present which indicates that a speed of the electric machine is greater than or equal to a specified threshold value, and/or the determination of the operating parameters is started by trigger information which is provided only when the first process provides finish information, and/or the determination of the temperature information is started by trigger information which is provided only when the process by which the operating parameters are calculated provides validation information.

A particularly efficient implementation of this higher-level process control is achieved if the process generating the trigger information realises a state machine which receives the start information and/or the finish information and/or the validation information as an input action. Advantageously, the generation of the trigger information is controlled by the second process or by a process carried out in a time slice that is retrieved less frequently than the first time slice.

In order to take into account a change in inductances during operation of the electric machine, it is also possible, when determining the temperature information, to determine, from a magnetic flux difference, a temperature difference to be added to a reference temperature as a function of an operating parameter, in particular of actual output currents of the power converter. Since a flux change caused by a temperature change, which in turn causes a change in the inductances, changes the operating point of the electric machine, a higher accuracy of temperature estimation, as compared with conventional methods, can be achieved by taking the operating parameter into account. This is especially true for highly saturated electric machines for automotive applications. The temperature difference can describe a first-order element of a Taylor series development of the estimated temperature of the permanent magnets. Preferably, the temperature difference is determined by means of a lookup table, which assigns temperature difference values to values of the operating parameter, or by means of a mathematical calculation rule, preferably a polynomial, which has the operating parameter as a variable.

In addition, the invention relates to a power converter for a permanently excited electric machine, comprising a computing device which is designed to carry out the method according to the invention.

The invention further relates to a vehicle comprising a permanently excited electric machine for driving the vehicle and the power converter according to the invention, which is designed to supply the electric machine.

Lastly, the invention relates to a computer program for loading into a memory of a computing device, comprising software code with which the method according to the invention is carried out when the computer program is run on the computing device. In particular, the computer program product may be loaded into the computing device of the power converter according to the invention.

All explanations of the method according to the invention can be transferred analogously to the power converter according to the invention, the vehicle according to the invention and the computer program according to the invention, so that the aforementioned advantages can also be achieved by these as well.

Figure 2:
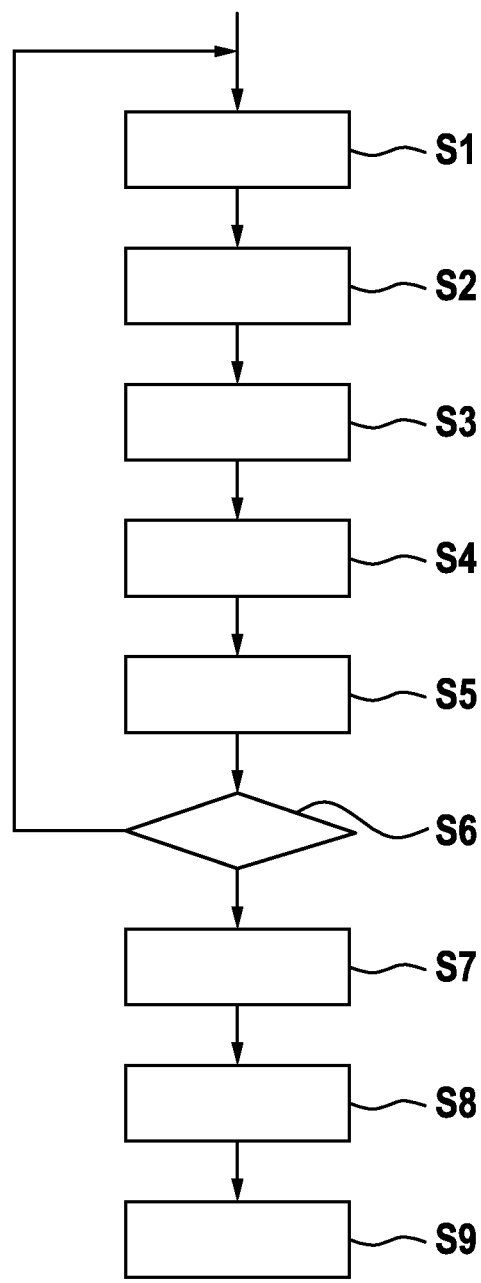
Figure 3:
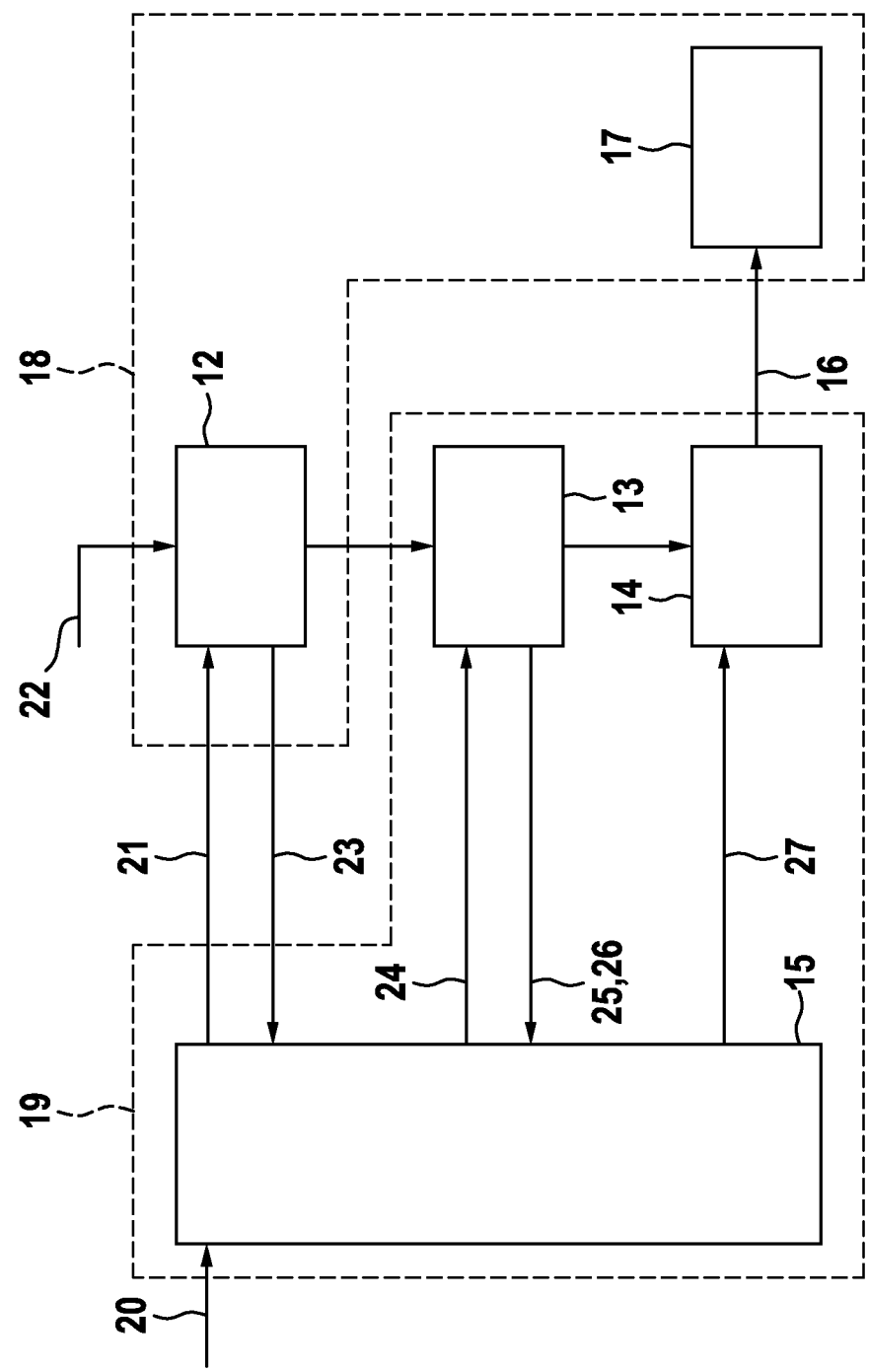

Further advantages and details of the present invention will become clear from the drawings described below. These are schematic representations and show:

FIG. 1 a basic sketch of an embodiment of the vehicle according to the invention with an embodiment of the power converter according to the invention;

FIG. 2 a flowchart of an embodiment of the method according to the invention;

FIG. 3 a process diagram of processes carried out during the method; and

Figure 4:
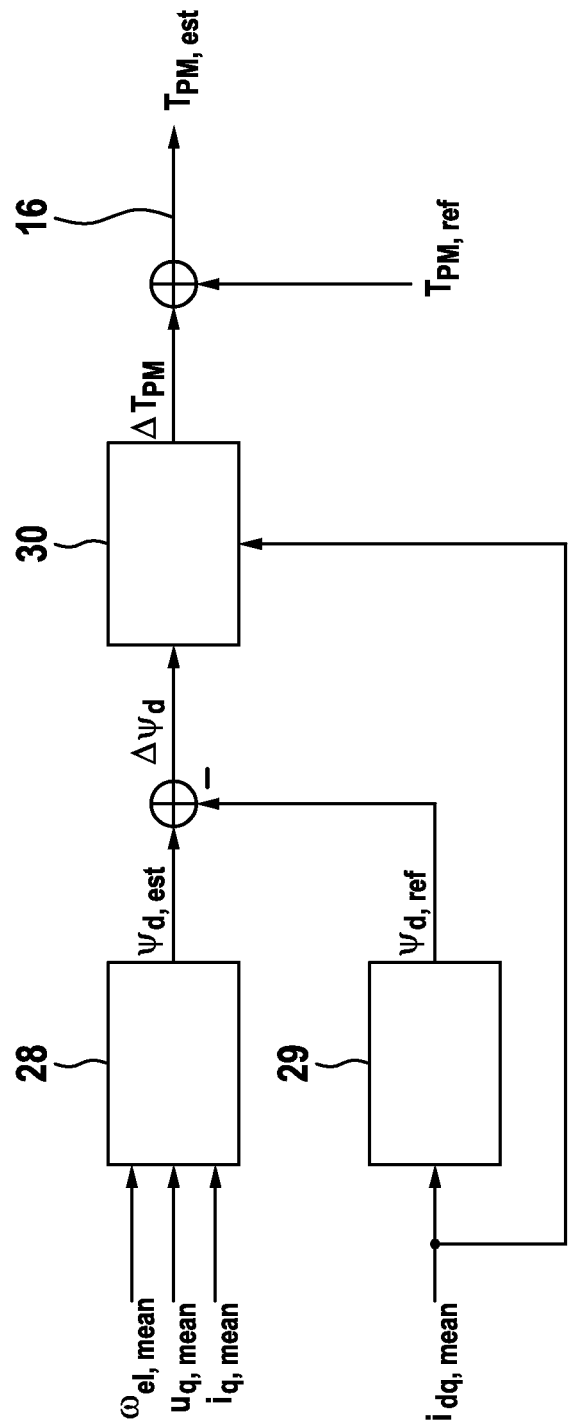

FIG. 4 a block diagram of an observer used during the method.

FIG. 1 is a schematic sketch of an embodiment of a vehicle 1, for example a hybrid vehicle or an electric vehicle, comprising a permanently excited electric machine 2 for driving the vehicle 1, an embodiment of a power converter 3 designed to supply the electric machine, and a high-voltage battery 4. The electric machine comprises a stator 5 and a rotor 7 having one or more permanent magnets 6.

The power converter 3 has a power unit 8, which is designed to convert a DC voltage supplied by the high-voltage battery 4 into a multi-phase AC voltage, which is fed to the electric machine 2. The power unit 8 is controlled by a computing device 9, which is realised by a microcontroller, for example. The computing device 9 has a central computing unit 10, which is operated with a real-time operating system, and a memory 11. The computing device 9 handles processes of a computer program loaded into the memory 11 in a number of time slices of different retrieval frequency. The computing device 9 is thus designed to carry out a method for operating the power converter 3 according to one of the following embodiments:

FIG. 2 is a block diagram of an embodiment of the method for operating the power converter 3. Within the scope of the method, a number of computing instructions or individual processes 12, 13, 14 are controlled by a higher-order individual process 15 and are presented in the process diagram shown in FIG. 3.

The method is used to determine temperature information 16, which describes a mean value of the temperature distribution of the permanent magnets 6, and to control the power converter 3 as a function of the temperature information 16. This control is carried out in a further individual process 17. Only individual processes 12, 17 are carried out by a first process 18 in a first time slice, the retrieval frequency of which corresponds to the clock frequency of the power converter 3. At a clock frequency of 10 kHz, the first process 18 is retrieved every 100 µs, for example. The individual processes 13, 14, 15, however, are carried out by a second process 19 in a second time slice, which is retrieved less frequently than the first time slice, for example every 10 ms.

In a step S1, the higher-level individual process 15 receives start information 20 as an input action, indicating that a speed of the electric machine 2 is greater than or equal to a specified threshold value, and then outputs trigger information 21. Only when this threshold value is reached or exceeded can the temperature information be meaningfully determined. For this purpose, the individual process 15 realises a state machine.

In a subsequent step S2, the presence of trigger information 21 starts the individual process 12 for detection of parameter values 22, which is performed in the first time slice. The detection is performed over the duration of a detection cycle, which comprises one or more electrical or mechanical periods of the electric machine 2. During this detection cycle, the individual process 12 accumulates sample values as parameter values 22 for the determination of operating parameters that describe a speed of the electric machine 2, an actual output current of the power converter 3, a target current specified for controlling the power converter 3, and an output voltage of the power converter 3. In addition, the individual process 12 determines minimum and maximum values of the parameter values 22 for the determination of a particular operating parameter. The accumulated sample or parameter values 22 and also the minimum and maximum values are stored in the memory 11.

In a subsequent step S3, the individual process 12 outputs finish information 23, which forms an input action of the state machine, to the individual process 15. If the finish information 23 is present, the individual process 15 outputs further trigger information 24.

When trigger information 24 is present, the individual process 13 for determining the operating parameters, which is carried out in the second time slice, is started in a step S4. To determine the operating parameters, a mean value of the parameter values 22 is first calculated over the duration of the detection cycle by dividing the accumulated parameter values 22 retrieved from memory 11 by the number of samplings.

In a subsequent step S5, the individual process 13 evaluates a validation criterion that describes a quasi-stationary operation of the electric machine 2. The validation criterion comprises a condition that a change in the target currents of the power converter 3 lies within a specified range, and a condition that a change in the speed of the electric machine lies within a specified range. For this purpose, the individual process 13 compares the minimum and maximum values, also retrieved from the memory 11, with specified threshold values.

In a step S6, the individual process 13 checks whether the validation criterion is met. If this is not the case, negative validation information 25 is output as an input action for the state machine. The state machine then generates a new trigger information 21—delayed if necessary—which triggers a new detection cycle through the individual process 12. The method has a corresponding jump back to step S2.

If, however, the check in the individual process 13 shows that the validation criterion is met, the mean values are thus stored as operating parameters in the memory 11 and positive validation information 26 is output as an input action to the superordinate individual process 15. This then generates further trigger information 27 for the individual process 14 in a step S7.

If trigger information 27 is present, the individual process 14 for determining the temperature information 16, which is carried out in the second time slice, is started in a step S8. The process 14 realises an observer, which is shown in detail in FIG. 4.

For this purpose, the individual process 14 comprises a sub-process 28, which retrieves the operating parameters, which comprise an averaged speed $\omega_{el,mean}$, an averaged q-component of the target or output voltage $u_{q,mean}$ and an averaged q-component of the actual output current $i_{q,mean}$, from the memory 11. Based on the stationary voltage equation of the electric machine 2

$$u_q = R_q \cdot i_q + \omega_{el} \Psi_d$$

the sub-process 28 determines a d-component of the estimated magnetic flux $$\Psi_{d,est} = \frac{u_{q,mean} - R_q \cdot i_{q,mean}}{\omega_{el,mean}}.$$

Here, $R_q$ describes a mean winding resistance effective in the q-axis, which is generally composed of an ohmic DC voltage component and an additional frequency-dependent component, which describes additional losses due to the skin effect and the proximity effect. The DC voltage component is adapted via a temperature coefficient of the conductor material and a measured winding temperature.

A further sub-process 29 of the individual process 14 uses a lookup table to determine a d-component of a magnetic reference flux $\Psi_{d,ref}$ from averaged dq-components of the actual output current $i_{dq,mean}$ for a given reference temperature $T_{PM,ref}$ of the permanent magnets 6. The difference between the d-components of the estimated magnetic flux $\Psi_{d,est}$ and the magnetic reference flux $\Psi_{d,ref}$ results in a d-component of a magnetic flux difference $\Delta\Psi_d$.

A next sub-process 30 of the individual process 14 uses a lookup table to determine a temperature difference $\Delta T_{PM}$ from the magnetic flux difference $\Delta\Psi_d$ and the averaged dq-components of the actual output current $i_{dq,mean}$, and this temperature difference, when added to the reference temperature $T_{PM,ref}$, gives the estimated temperature $T_{PM,est}$ of the permanent magnet 6 as temperature information 16.

The determination of the estimated temperature $T_{PM,est}$ is based on the following Taylor series development:

$$T_{PM,est} = T_{PM,ref} + \frac{\partial T_{PM}}{\partial \Psi_d}(\Psi_{d,est} - \Psi_{d,ref}) + \frac{1}{2}\frac{\partial^2 T_{PM}}{\partial \Psi_d^2}(\Psi_{d,est} - \Psi_{d,ref})^2 + \ldots$$

The d-component of the magnetic reference flux $\Psi_{d,ref}$ thus describes the fundamental wave of the flux at the reference temperature $T_{PM,ref}$. For the implementation described here, it is basically sufficient to consider only the first-order derivative for the estimation. The first-order derivative is basically a function of the dq components of the actual output current $i_{dq}$, which is especially true for highly saturated traction machines in automotive applications. The first-order derivative can therefore be stored as a lookup table—as described above—or can be described by a polynomial depending on the averaged dq components of the actual output current $i_{dq,mean}$.

By taking into account the current averaged dq components of the actual output current $i_{dq,mean}$, changes in the inductances that are ignored in conventional methods can also be taken into account. Especially in highly saturated machines, a change in the d-component of the magnetic flux dependent on the temperature of the permanent magnets 6 has a strong dependence on the dq-components of the actual output current, and thus their consideration leads to a significant increase in the accuracy of the estimation.

In a last step S9, the power converter 3 is controlled by the individual process 17 carried out in the first time slice, depending on the temperature information 16. During this individual process, the clocked switching signals for switching elements of the power unit 8 are determined as a function of the temperature information 16, wherein a power reduction (derating) takes place if the temperature of the permanent magnets 6 is high. If this power reduction is not sufficient, protection of the permanent magnets 6 is initiated by reducing the speed of the electric machine 2. For this purpose a message is output to a superimposed control unit (not shown) of the vehicle 1. The control unit then implements a drivetrain limitation (speed limitation).

According to further embodiments of the method, only one or some of the individual processes 13, 14, 15 are carried out in the first process 18, and the other individual processes are carried out as separate processes. Likewise, the individual processes 12, 17 can be carried out as separate processes. Here, it is merely essential that the time slices in which the processes corresponding to the individual processes 12, 17 are carried out are retrieved more frequently than the time slices in which the processes corresponding to the individual processes 13, 14, 15 are carried out.

The invention claimed is:

1. A method for operating a power converter for a permanently excited electric machine,
   wherein temperature information, which describes a temperature of at least one permanent magnet of the electric machine, is determined by means of an observer as a function of operating parameters of the electric machine, and the power converter is controlled as a function of the temperature information,
   wherein a computing device, which handles processes in time slices, carries out a first process in a first time slice for detecting parameter values for determining the operating parameters and carries out a second process, which determines the temperature information, in a second time slice, which is retrieved less frequently than the first time slice
   wherein the parameter values are detected over a duration of a detection cycle comprising one or more electrical or mechanical periods of the electric machine, and
   wherein the parameter values are only used to determine the operating parameters if a validation criterion describing the existence of quasi-stationary operation of the electric machine is met and a new detection cycle is carried out if the validation criterion is not met.

2. The method according to claim 1, wherein clocked switching signals for the control of the power converter are also generated by the first process.

3. The method according to claim 1, wherein mean values of the parameter values are calculated over the duration of the detection cycle for determining the operating parameters.

4. The method according to claim 1, wherein the validation criterion comprises a condition that a change of target currents of the power converter is within a specified range and/or a condition that a change of a speed of the electric machine is within a specified range.

5. The method according to claim 3, wherein the calculation of the mean values and/or an evaluation of the validation criterion is carried out by the second process or by a process carried out in a time slice which is retrieved less frequently than the first time slice.

6. The method according to claim 1, wherein the detection of the parameter values is started by trigger information which is only provided when start information is present which indicates that a speed of the electric machine is greater than or equal to a specified threshold value, and/or the determination of the operating parameters is started by trigger information which is provided only when the first process provides finish information, and/or the determination of the temperature information is started by trigger information which is provided only when the second process by which the operating parameters are calculated provides validation information.

7. The method according to claim 6, wherein the generation of the trigger information is controlled by the second process or by a process performed in a time slice which is retrieved less frequently than the first time slice.

8. The method according to claim 6, wherein the first process generating the trigger information realises a state machine which receives the start information and/or the finish information and/or the validation information as an input action.

9. The method according to claim 1, wherein, when determining the temperature information, a temperature difference to be added to a reference temperature is determined from a magnetic flux difference as a function of an operating parameter including actual output currents of the power converter.

10. A power converter for a permanently excited electric machine, comprising a computing device which is designed to carry out a method according to claim 1.

11. A vehicle comprising a permanently excited electric machine for driving the vehicle and a power converter according to claim 10, which is designed to supply the electric machine.

12. A computer program for loading into a memory of a computing device, comprising software code with which a method according to claim 1 is performed when the computer program is run on the computing device.

* * * * *